United States Patent
Peng et al.

(10) Patent No.: US 8,576,672 B1
(45) Date of Patent: Nov. 5, 2013

(54) HEAT SINK LAYER

(75) Inventors: Chubing Peng, Minnetonka, MN (US);
Edward Charles Gage, Lakeville, MN (US); Ganping Ju, Pleasanton, CA (US); Jan-Ulrich Thiele, Sunnyvale, CA (US); Kaizhong Gao, Shoreview, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/481,207

(22) Filed: May 25, 2012

(51) Int. Cl.
*G11B 11/00* (2006.01)

(52) U.S. Cl.
USPC .............. 369/13.14; 369/13.24; 369/13.35; 369/13.01

(58) Field of Classification Search
None
See application file for complete search history.

(56) References Cited

U.S. PATENT DOCUMENTS

| | | | |
|---|---|---|---|
| 7,251,089 | B2 | 7/2007 | Peng |
| 8,399,051 | B1 * | 3/2013 | Hellwig et al. ............... 427/131 |
| 2005/0157597 | A1 | 7/2005 | Sendur et al. |
| 2011/0286127 | A1 | 11/2011 | Gao et al. |

OTHER PUBLICATIONS

Challener et al., "Heat-assisted magnetic recording by a near-field transducer with efficient optical energy transfer", Nature Photonics, vol. 3, Mar. 22, 2009, pp. 220-225.

\* cited by examiner

*Primary Examiner* — Muhammad N Edun
(74) *Attorney, Agent, or Firm* — Hollingsworth Davis, LLC

(57) ABSTRACT

A layer configured for use in a magnetic stack has electrical resistivity greater than about $5 \times 10^{-8}$ $\Omega$m and thermal conductivity greater than about 1 W/mK. In some arrangements, the magnetic stack includes a substrate with the layer disposed over the substrate, a magnetic recording layer disposed over the layer, and a thermal resist layer disposed between the layer and the magnetic recording layer. In some arrangements, the layer is configured to function as a heat sink and a soft under layer. A system that incorporates the layer can include a magnetic write pole, a near field transducer (NFT) positioned proximate the write pole that radiates energy.

22 Claims, 15 Drawing Sheets glass substrate/Cu(50nm)/W(25nm)/MgO (10nm)/FePtCuC: Optical spot=(34.6, 39.5)nm, $CE_{50}$ =0.0327

HEAT SINK LAYER

BACKGROUND

Higher areal storage density for magnetic storage drives can be achieved by decreasing the size of magnetic grains used for magnetic recording media. As grain sizes with a given magnetic anisotropy energy decrease in volume, eventually a stability limit is reached, at which random thermal fluctuations at room temperature result in magnetization reversal and corresponding loss of data reliability.

To avoid the thermal stability limit, materials having higher magnetic anisotropy energy at room temperature can be used to form the magnetic grains of a magnetic stack. However, writing data to these high magnetic anisotropy materials is more difficult and some type of energy assistance may be used to temporarily reduce the magnetic anisotropy energy of the materials while a magnetic write field is applied. For example, one form of energy assisted magnetic recording, referred to as heat assisted magnetic recording (HAMR) involves heating a magnetic medium in synchrony with a writing magnetic field.

SUMMARY

A layer configured for use in a magnetic stack has electrical resistivity greater than about $5 \times 10^{-8}$ $\Omega$m and thermal conductivity greater than about 1 W/mK. In some arrangements, the magnetic stack includes a substrate with the layer disposed over the substrate, a magnetic recording layer disposed over the layer, and a thermal resist layer disposed between the layer and the magnetic recording layer. In some arrangements, the layer is configured to function as a heat sink and a soft under layer. A system that incorporates the layer can include a magnetic write pole, a near field transducer (NFT) positioned proximate the write pole that radiates energy.

These and other features and aspects of various embodiments may be understood in view of the following detailed discussion and accompanying drawings.

DETAILED DESCRIPTION

Heat assisted magnetic recording (HAMR) involves materials and structures of the magnetic medium that can accommodate the relatively high temperatures involved in the writing process as well as providing magnetic properties suitable for HAMR. The size of the heated spot on the magnetic medium is related to the achievable recording density. The hot spot is quickly heated during the writing phase, and is then cooled quickly before thermal fluctuations disturb the written data. A thermal heat sink layer in the magnetic medium can help to provide minimal thermal spot size on the magnetic recording layer and data stability by removing the heat from the magnetic recording layer rapidly. Low resistivity materials in a heat sink can decrease the coupling efficiency, which is the ratio between the energy used to heat the medium which is absorbed into the media divided by the energy incident on the media.

Figure 1:
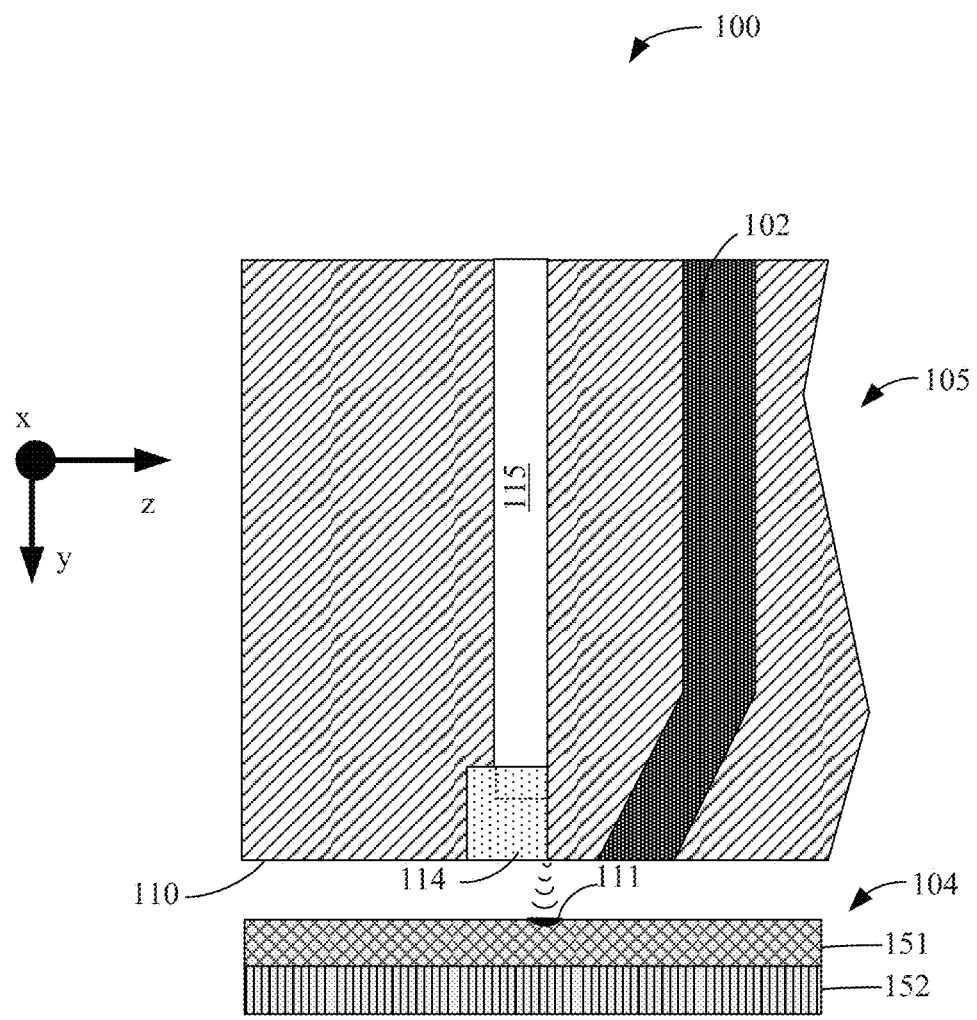
FIG. 1 is a perspective view of a magnetic storage system comprising a medium that includes an image charge mitigation (ICM) heat sink according to an example embodiment.

FIG. 1 is a diagram of a system 100 that may be used for heat assisted magnetic recording (HAMR). FIG. 1 shows some aspects of a HAMR head 105 and HAMR medium 104. The HAMR head 105 includes a portion 101 that provides the energy used to heat the hot spot 111 on the medium 104. The HAMR head 105 also includes a magnetic write pole 102 configured to generate a magnetic write field that varies based on data (write data) to be written to the medium 104. As the medium 104 moves relative to the HAMR head 105, the position of the hot spot 111 on the medium 104 moves in synchrony with a magnetic write field. The hot spot 111 lowers the coercivity of the medium in a localized area, temporarily decreasing the strength of the magnetic field required to write data to the medium 104, and allowing the writing of data by the writing field before the local region cools back to ambient temperature.

A HAMR head 105 may utilize optical components to produce the hot spot on the recording medium. A coherent light source, such as a laser, may provide the energy for this heating operation, and optical components, e.g., built in to a slider that houses the write head, are configured direct this energy onto the medium 104. Energy from the light source is launched into a waveguide 115 integrated into the head 105. The light propagates through the waveguide and may be coupled to an optical NFT 114, e.g., either directly from the waveguide or by way of a focusing element. The NFT 114 may be located at an air bearing surface (ABS) 110 of the head 105, and may be placed in close proximity to a magnetic write pole that is also part of the head 105. This co-location of the NFT with the magnetic write pole facilitates heating the hot spot during magnetic write operations.

To achieve a specified data density, the hot spot 111 may be smaller than a half-wavelength of the light. However, due to what is known as the diffraction limit, optical components cannot focus the light at this scale. Tiny confined hot spots can be achieved a plasmonic optical antenna or an aperture-integrated in an optical waveguide of high contrast in the index of refractive index between the waveguide core and its claddings. Light propagating in the waveguide is focused by an optical focusing element, such as a planar solid immersion mirror into an optical near-field transducer. This causes surface plasmon excitation at the NFT 114.

A high electric field surrounds the NFT 114 due to the collective oscillations of electrons at the metal surface. Part of this field can tunnel into a storage medium and become absorbed, thereby heating the hot spot on the medium as it being recorded. One Figure of merit (FOM) for a HAMR system is coupling efficiency, which refers to an amount of light power absorbed into the medium divided by the power incident on the medium. While the incident light power may be distributed over a fairly broad area, the efficiencies calculated herein may refer to a particular area of interest. For example, the coupling efficiency in a 50 nm by 50 nm is referred to herein as $CE_{50}$.

As illustrated in FIG. 1, HAMR medium 104 can include a magnetic recording layer 151 and a heat sink layer 152, wherein the recording layer 151 is disposed between the head 105 and the heat sink layer 152. A heat sink layer 152 in the magnetic medium 104 can be used to achieve a specified thermal spot size on the magnetic recording layer 151 and provide some amount of data stability by removing the heat from the magnetic recording layer rapidly. The heat sink layer in HAMR can comprise materials that have good thermal conductivity, such as Al, Cu, AlZr, and CuZr. However, these materials may also have low electrical resistivity. Low resistivity materials in a HAMR heat sink can decrease the coupling efficiency of certain near-field transducers where the electric field is transversely dominated, i.e. the electric field is mainly parallel to the media plane, due to the high electric field generated near the NFT and image charges created in the heat sink in response to the high electric field.

In accordance with various embodiments in this disclosure, suitable materials for a thermal heat sink 152 comprises materials having both a sufficiently high thermal conductivity to remove the heat from the magnetic recording layer, and a sufficiently high electrical resistivity to mitigate the image charge effect produced by the NFT. Such heat sinks are referred to herein as "image charge mitigation (ICM) heat sinks" to distinguish them from heat sinks made of lower resistivity materials which produce stronger image charges in the heat sink layer. The preferred heat sink material for an ICM heat sink comprises at least one of an electrical insulator, a dielectric, a lossy metal, and a semiconductor. These materials arranged in an ICM heat sink can increase coupling efficiency between the NFT and the media due to the mitigation of image charges in the heat sink layer.

In some cases, the ICM heat sink is a single layer of material. In other cases, the ICM heat sink is a multi-layer structure. According to some example embodiments, the ICM heat sink can function as a heat sink and a soft magnetic under layer. According to other example embodiments, the ICM heat sink can include a heat sink layer having sufficient thermal conductivity and sufficient electrical resistivity as described above and an additional heat sink layer can be disposed above or below the heat sink layer having sufficient thermal conductivity and sufficient electrical resistivity. The additional heat sink layer may comprise a relatively low resistivity or a relatively high resistivity material, such as an electrical conductor, an electrical insulator, a dielectric, a lossy metal, and/or a semiconductor. In cases where a relatively low resistivity material is used as the additional heat sink layer, the additional heat sink layer can be disposed farther away from the magnetic layer to avoid image charge effects. According to various embodiments, a magnetic stack comprising a silicon heat sink layer disposed on a glass substrate can be used to enable a low cost volume production, which has suitable thermal, optical, and mechanical properties.

Figure 2:
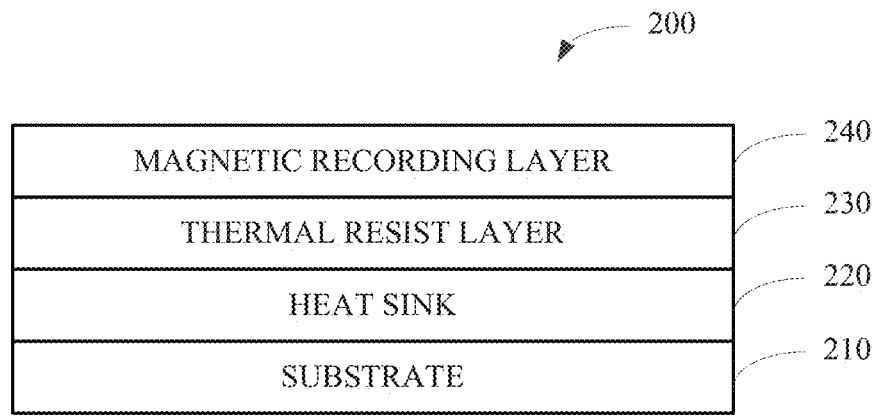
FIGS. 2 and 3 are cross sectional diagrams of a magnetic stack that includes a heat sink layer according to various embodiments.

FIGS. 2-6 show various single and multiple layer ICM heat sink structures. In these Figures, like reference numerals are used to designate similar elements. FIG. 2 shows a cross sectional diagram of a magnetic stack 200 that includes an ICM heat sink 220. The magnetic stack 200 comprises a substrate 210, an ICM heat sink 220 disposed over the substrate 210, a thermal resist layer 230 disposed between the heat sink 220 and a magnetic recording layer 240.

The substrate 210 may be made of any suitable material, such as ceramic glass, amorphous glass, or NiP coated Al—Mg alloy. The ICM heat sink 220 may be a single layer or a multi-layer structure. The magnetic recording layer 240 may include crystalline grains of magnetic material, such as $L1_o$ FePt segregated by a non-magnetic material, such as an oxide. For HAMR, an average volume of the crystalline grains can be less than about 12 nm×12 nm in-plane footprint, with a thickness of the recording layer less than about 20 nm. The thermal resist layer may comprise MgO, for example.

If a single heat sink layer 220 is used for the ICM heat sink, the material for the heat sink layer 220 is chosen to have a thermal conductivity greater than about 1 W/mK and an electrical resistivity greater than about $5 \times 10^{-8}$ Ωm. In some cases, the material for the heat sink layer 220 is chosen to have a thermal conductivity greater than about 40 W/mK, or greater than about 100 W/mK, or even greater than about 200 W/mK.

In some implementations, the material for the ICM heat sink layer 220 is chosen to have an electrical resistivity greater than about $1 \times 10^{-7}$ Ωm or greater than about $1 \times 10^{-6}$ Ωm. Materials having electrical resistivity in the range of $5 \times 10^{-8} \times 1 \times 10^{-7}$ Ωm may fall into the category of lossy metals. In some cases, the material for the heat sink layer 220 has an electrical resistivity greater than about 1 Ωm, or greater than about 100 Ωm, or even greater than 1000 Ωm. For example, some semiconductors suitable for use in an ICM heat sink layer have resistivity of between $10^3$ and $10^5$ Ωm. In some cases, suitable materials for an ICM heat sink layer may have resistivity greater than $10^{11}$ or $10^{12}$. These materials may be semiconductors or dielectrics, for example.

Suitable materials for an ICM heat sink 220 include at least one of an electrical insulator, a dielectric, a lossy metal, and a semiconductor. Some representative, materials for an ICM heat sink include a dielectric material such as diamond like carbon (DLC), a lossy metal material such as W, Mo, Ru, and Cr, and/or a semiconductor such as Si, BeO, SiC and AlN.

Table 1 provides electrical resistivity and thermal conductivity for some materials that may be used in an ICM heat sink.

TABLE 1

| Material | Electrical Resistivity (Ω m) | Thermal Conductivity (W/mK) | Material Type |
|---|---|---|---|
| Al | $3 \times 10^{-8}$ | 200 | Conductor |
| Cu | $2 \times 10^{-8}$ | 160~300 | Conductor |
| AlZr | $3 \times 10^{-8}$ | 100 | Conductor |
| CuZr | $>10^{-8}$ | 160 | Conductor |
| W | $1.63 \times 10^{-7}$ | 70, 55 | Lossy metal |
| Mo | $5 \times 10^{-8}$ | 138 | Lossy metal |
| Ru | $1 \times 10^{-8}$ | 116 | Lossy metal |
| Cr | $1.25 \times 10^{-7}$ | 69, 94 | Lossy metal |
| Si | $10^3$ | 130 | Semiconductor |
| BeO | $10^5$ | 265 | Semiconductor |
| SiC | $1~10^4$ | 375~120 | Semiconductor |
| AlN | $>=10^{12}$ | 70~210 | Semiconductor |
| Diamond | $10^{11}$ | 2200 | Dielectric |
| DLC | $10^{11}$ | 2 | Dielectric |
| Co | $6 \times 10^{-8}$ | 100 | Magnetic/Magnetic Alloy |
| NiFe | $1.3 \times 10^{-7}$ | 28 | Magnetic/Magnetic Alloy |

Note:
(1) These values are fabrication process-dependent.
(2) If alloy, it also depends on composition.

Figure 3:
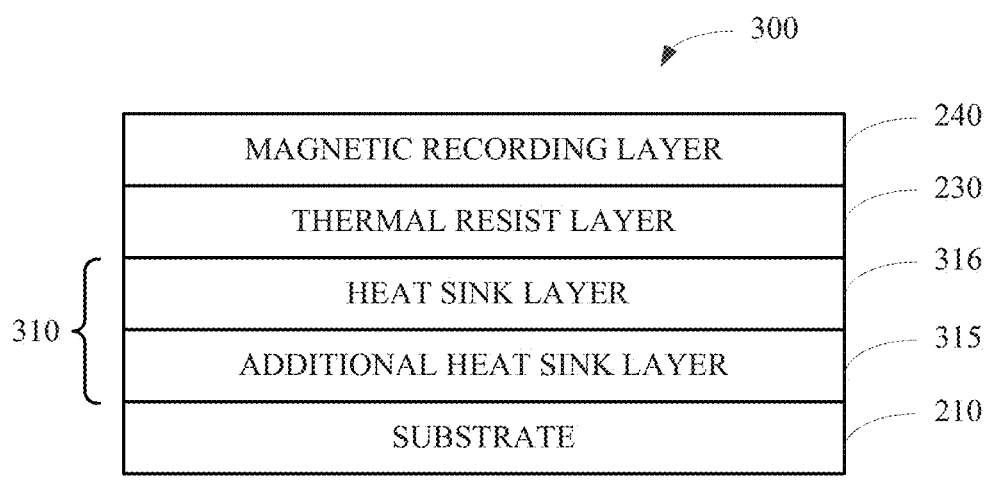

As shown in FIG. 3, the ICM heat sink may have multiple layers. FIG. 3 depicts a cross sectional diagram of a magnetic stack 300 that includes a substrate 210, a multilayer ICM heat sink 310, a thermal resist layer 230, and magnetic recording layer 240. ICM heat sink 310 includes heat sink layer 316 and additional heat sink layer 315. Heat sink layer 316 is disposed under the thermal resist layer 230 and is in closer proximity to the magnetic recording layer 240 than heat sink layer 315. Heat sink layer 316 may have ICM properties and material similar to layer 220 discussed in connection with FIG. 2. For example, heat sink layer 316 can have a thermal conductivity greater than about 1 W/mK and an electrical resistivity greater than about $5 \times 10^{-8}$ Ωm. As previously discussed, suitable materials for the ICM heat sink layer 316 include electrical insulators, dielectric materials, lossy metals (also denoted refractory metals or lossy metals), and/or semiconductors.

Additional heat sink layer 315 is disposed between the substrate 210 and heat sink layer 316. In some cases, additional heat sink layer 315 may have electrical resistivity less than heat sink layer 316. For example, additional heat sink layer 315 may be a good electrical conductor and may have thermal conductivity greater than about 1 W/mK and electrical resistivity less than about $5 \times 10^{-8}$ Ωm or even less than about $1 \times 10^{-8}$ Ωm. In some cases, the additional heat sink layer 315 may comprise one or more good electrical conductors such as Cu, and Al, and/or other materials that are thermally and electrically conductive. In some cases, the additional heat sink layer 315 has a thickness of about 0 nm to about 200 nm. The thickness of heat sink layer 316 is sufficient to mitigate image charge effects due to the higher electrical conductivity of heat sink layer 315. For example, heat sink layer 316 can have a thickness of about 10 nm to about 200 nm.

Figure 4:
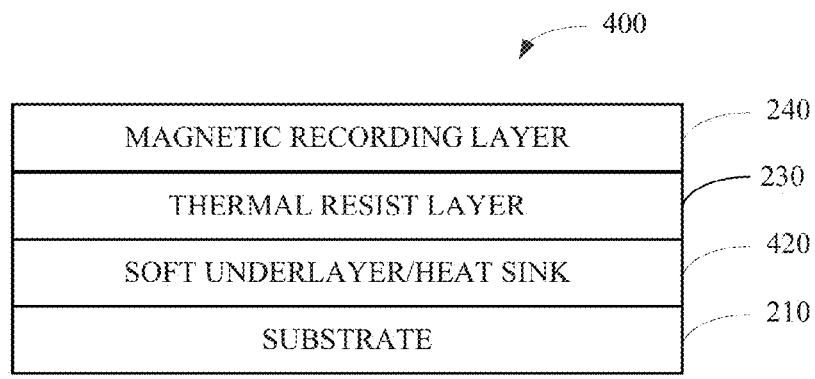
FIGS. 4-6 are cross sectional diagrams of a magnetic stack that includes a layer which is configured to function as a heat sink and a soft under layer according to various embodiments.

In some implementations, the ICM heat sink may have multiple functions, e.g., such as serving as an ICM heat sink as well as a soft magnetic underlayer. FIG. 4 shows a cross sectional diagram of a magnetic stack 400 that includes heat sink 420 which is configured to function as an ICM heat sink and a soft magnetic underlayer. In some cases, this dual purpose ICM heat sink may be a single layer structure and in other cases multiple layers can be used for the dual purpose ICM heat sink. FIG. 4 illustrates a single layer ICM heat sink 420 that also functions as a soft magnetic underlayer for the magnetic stack 400. The magnetic stack 400 further comprises a substrate 210, a thermal resist layer 230, and a magnetic recording layer 240. The heat sink layer 420 is disposed over the substrate 210. The thermal resist layer 230 is disposed over the heat sink layer 420, and the magnetic recording layer 240 is disposed over the thermal resist layer 230. The heat sink layer 420 may have coercivity less than about 100 Oe, relative permeability greater than about 10, and/or thickness of about 0 nm to about 50 nm. Heat sink layer 420 may have ICM properties and material similar to layer 220 discussed in connection with FIG. 2. For example, ICM heat sink layer 420 can have thermal conductivity greater than about 1 W/mK and electrical resistivity greater than about $5 \times 10^{-8}$ Ωm. Suitable materials for heat sink layer 420 include one or more of Co, CoFe, NiFe, CoNiFe and CoFeB, for example.

Figure 5:
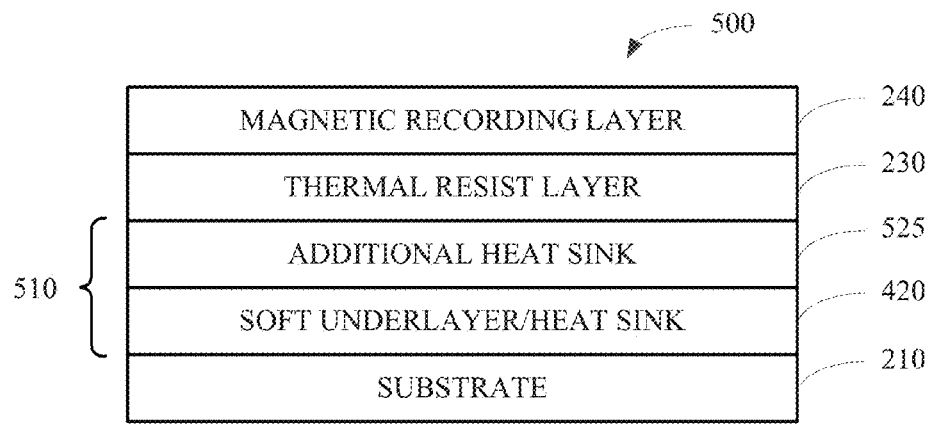

FIG. 5 shows a cross sectional diagram of a magnetic stack 500 that includes a multilayer ICM heat sink 510. ICM heat sink 510 includes heat sink layer 420 which is configured to function as a heat sink layer and as a soft magnetic underlayer. In some cases, heat sink layer 420 includes a single layer of material, and in other cases multiple layers may be used. ICM heat sink 510 may also include an additional heat sink layer 525, which can be a single layer structure or a multiple layer structure. Heat sink layer 525 may have ICM properties to mitigate the image charge effect. Heat sink layer 420 is disposed over the substrate 210, and a thermal resist layer 230 is disposed over heat sink layer 525 so that the additional heat sink layer 525 is closer to the magnetic recording layer than layer 420. The material for the additional heat sink layer 525 may be similar to the materials previously discussed for layer 220 discussed in connection with FIG. 2. For example, the material for the additional heat sink layer 525 may be chosen to have a thermal conductivity greater than about 1 W/mK and an electrical resistivity greater than about $5 \times 10^{-8}$ Ωm. For example, heat sink layer 525 may include at least one of an electrical insulator, a dielectric, a lossy metal, and/or a semiconductor. Some representative, non-limiting materials for the additional heat sink layer 525 include a dielectric material such as diamond like carbon (DLC), a lossy metal material such as W, Mo, Ru, and Cr, and a semiconductor such as Si, BeO, SiC and AlN as previously discussed. The soft magnetic underlayer/heat sink 420 may comprise any material that has properties suitable for a heat sink, e.g., sufficient conductivity, and magnetic properties suitable for a soft magnetic underlayer.

Figure 6:
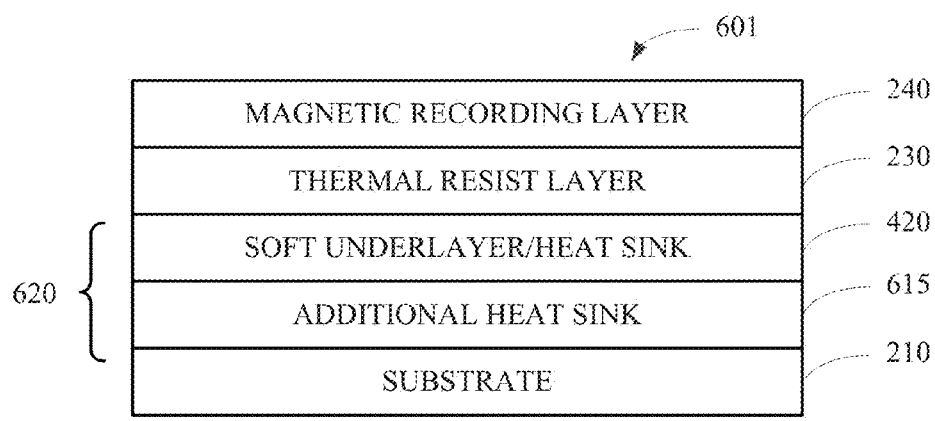

FIG. 6 shows a cross sectional diagram of a magnetic stack 601 that includes a multilayer ICM heat sink 620. Heat sink 620 includes heat sink layer 420 which is configured to function as an ICM heat sink layer and a soft magnetic under layer as previously discussed. An additional heat sink layer 615 is disposed between the substrate 210 and the heat sink layer 420, and is thus farther from the magnetic recording layer 240 than ICM heat sink layer 420. The material for the additional heat sink layer 615 can be any material with sufficient thermal conductivity to provide a heat sink. Heat sink layer 615 may have ICM properties and/or can have material similar to layer 525 discussed in connection with FIG. 6. For example, the additional heat sink layer 615 can have a thermal conductivity greater than about 1 W/mK. In some cases, the additional heat sink layer 615 can have an electrical resistivity greater than about $5 \times 10^{-8}$ Ωm. Suitable materials can include at least one of an electrical insulator, a dielectric, a lossy metal, and/or a semiconductor. In some embodiments, the additional heat sink layer 615 may have an electrical resistivity less than the heat sink layer 420. In some cases, the additional heat sink layer 615 may have an electrical resistivity greater than about $5 \times 10^{-8}$ Ωm. In these embodiments, the materials of heat sink layer 615 may be similar to the materials discussed in connection with layer 220. In some cases, the additional heat sink layer 615 may have an electrical resistivity less than about $5 \times 10^{-8}$ Ωm. In this scenario, suitable materials include conductors such as Cu, and Al.

In accordance with various embodiments, the magnetic stacks illustrated in FIGS. 2-6 can be used in a system 100 as shown in FIG. 1. The system 100 comprises a magnetic write pole 102, an NFT 114 positioned proximate the write pole 102 and comprising an energy radiating end that radiates energy, and a magnetic stack 104 as illustrated in one of FIGS. 2-6, the magnetic stack 104 located a head-media separation (HMS) distance from the NFT 114. The HMS is about 1 nm to about 15 nm and the coupling efficiency $CE_{50}$ between the energy radiated by the NFT 114 and the magnetic stack is about 1% to about 10%. According to one example embodiment, the magnetic stack 104 comprises a substrate, an ICM heat sink layer, a thermal resist layer, and a magnetic recording layer. As previously discussed, the ICM heat sink layer may have properties and material similar to layer 220 discussed in connection with FIG. 2. Specially, The ICM heat sink layer may have a thermal conductivity greater than about 1 W/mK and an electrical resistivity greater than about $5 \times 10^{-8}$ Ωm.

Figure 7A:
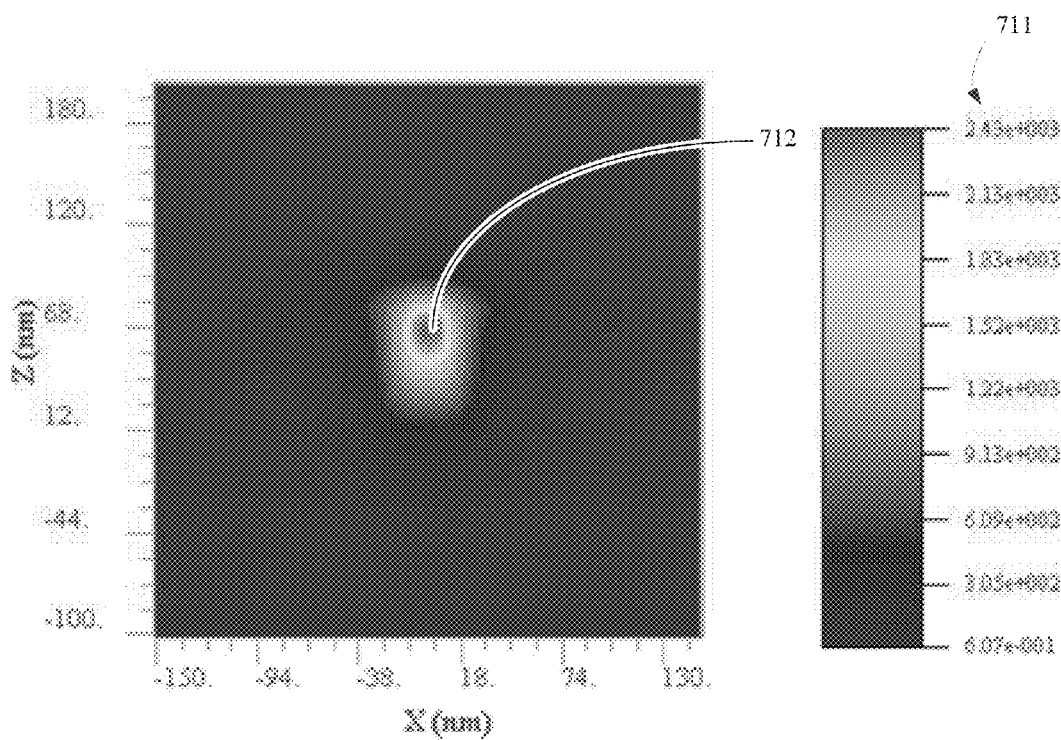
FIGS. 7-9 are schematic representations of light absorption and thermal profiles according to various example embodiments.
Figure 7B:
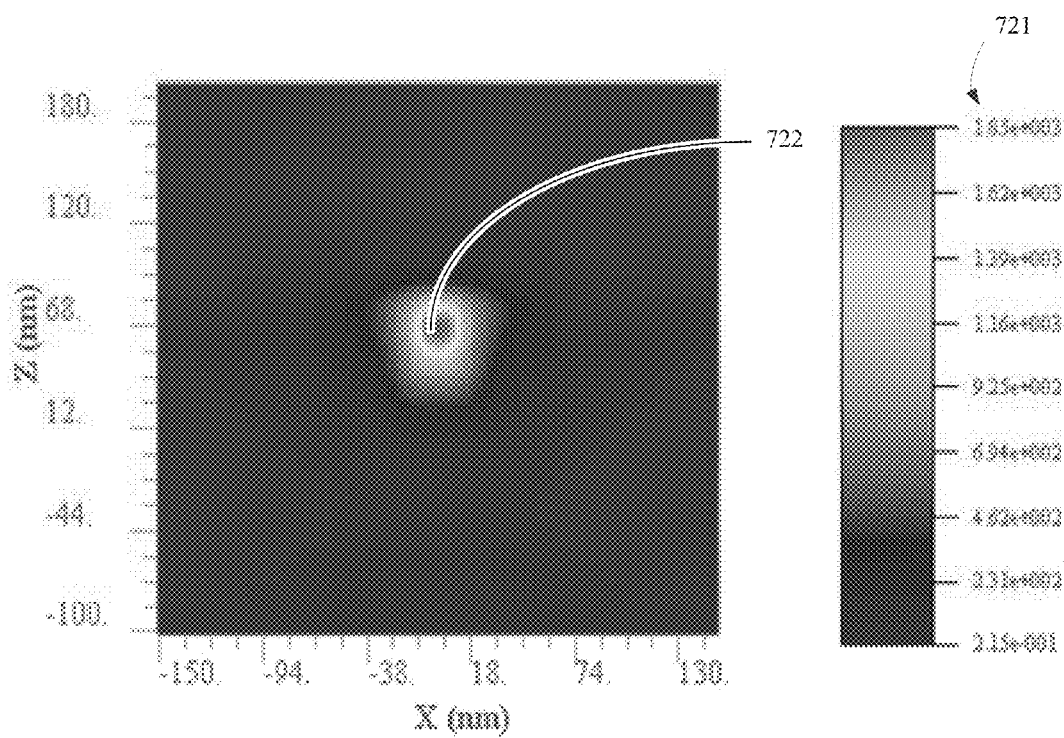
Figure 7C:
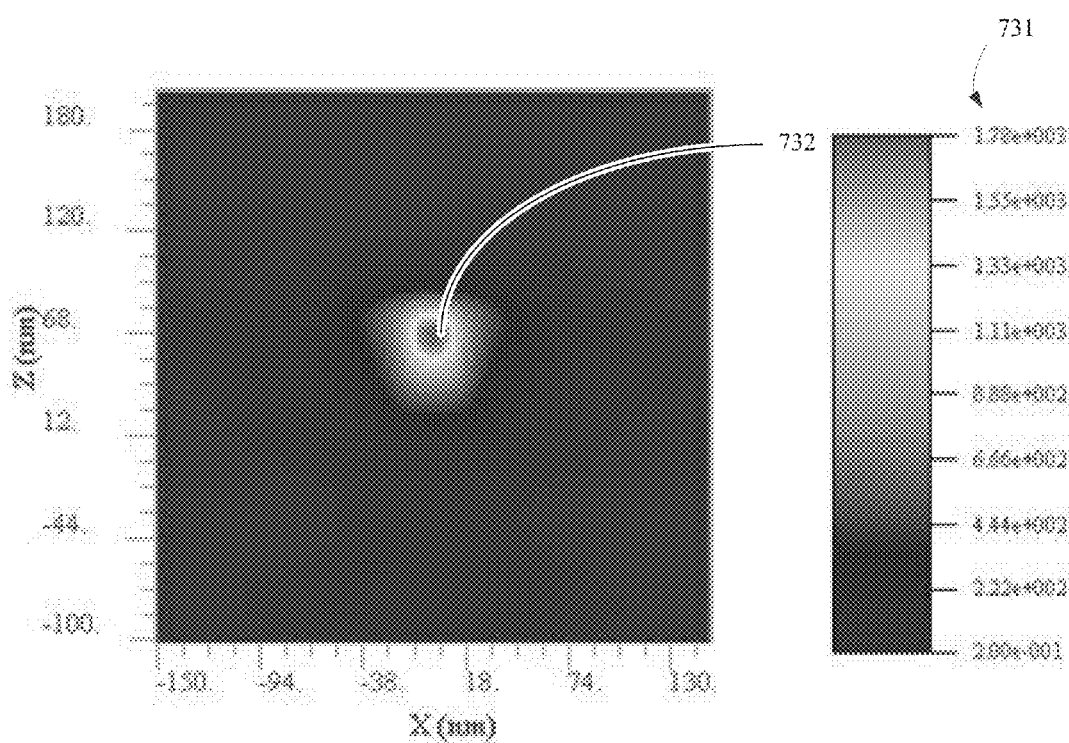
Figure 7D:
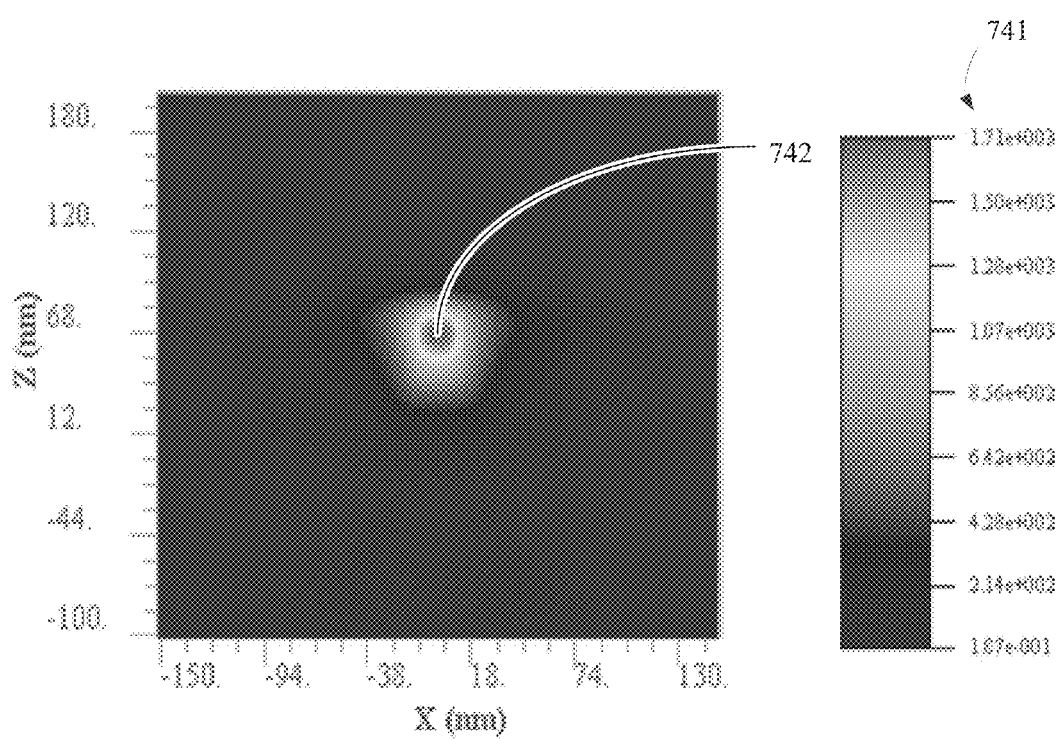
Figure 7E:
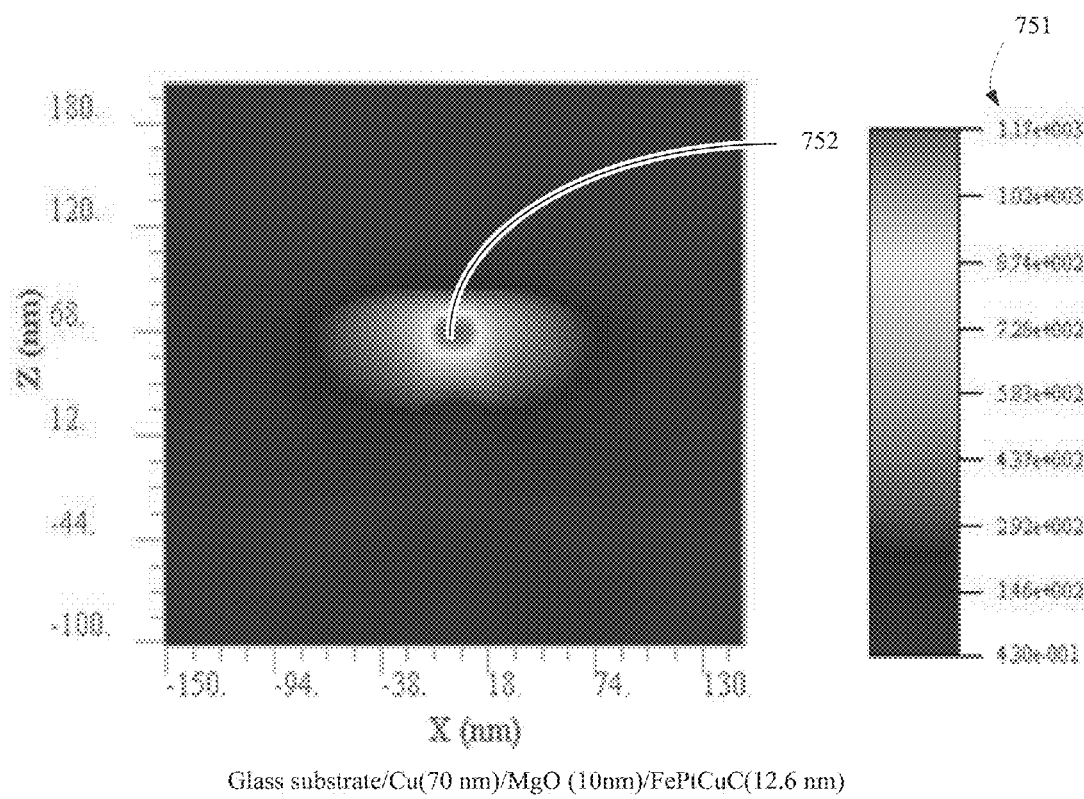

FIGS. 7A-7E show the computed light absorption profiles in a recording media with differing heat-sink material: Si (FIG. 7A), W (FIG. 7B), Mo (FIG. 7C), Ru (FIG. 7D), and Cu (FIG. 7E). The HMS spacing between the recording media and NFT is 8 nm. FIG. 7A shows the light absorption profile for the structure: Silicon substrate/MgO (20 nm)/FePtCuC (12.6 nm); FIG. 7B shows the light absorption profile for the structure: Glass substrate/W (50 nm)/MgO (10 nm)/FePtCuC (12.6 nm); FIG. 7C shows the light absorption profile for the structure: Glass substrate/Mo (50 nm)/MgO (10 nm)/FePtCuC (12.6 nm); FIG. 7D shows the light absorption profile for the structure: Glass substrate/Ru(50 nm)/MgO (10 nm); and FIG. 7E shows the light absorption profile for the structure: Glass substrate/Cu (70 nm)/MgO (10 nm)/FePtCuC (12.6 nm).

Larger peak optical absorption 712, 722, 732, 742, 752 of the optical spot indicates a better coupling efficiency. It can be appreciated by observing the peak absorption magnitude (shown by the values in legends 711, 721, 731, 741, 751) that Si heat sink material yields the greatest coupling efficiency, while Cu is lowest. The unit for the peak absorption magnitude is watts/$(\mu m)^3$ with incident power=1 watt. For example, the peak absorption magnitude for Si heat-sink layer is $2.43 \times 10^3$ watts/$(\mu m)^3$ (see legend 711). With a highly electric conductor as heat-sink, the optical spot is broadened along cross-track direction, i.e., the X-direction. By choosing a suitable heat-sink material, the optical confinement between down-track (Z-direction) and cross-track can be tuned for recording density.

As previously discussed, as used herein, the term "coupling efficiency" refers to an absorbed light power coupled into the media divided by the power incident on the media. While the incident power may be distributed over a fairly broad area, the efficiencies calculated herein may refer to a particular area of interest. For example, the coupling efficiency in a 50 nm by 50 nm may be referred to herein as $CE_{50}$.

Figure 8A:
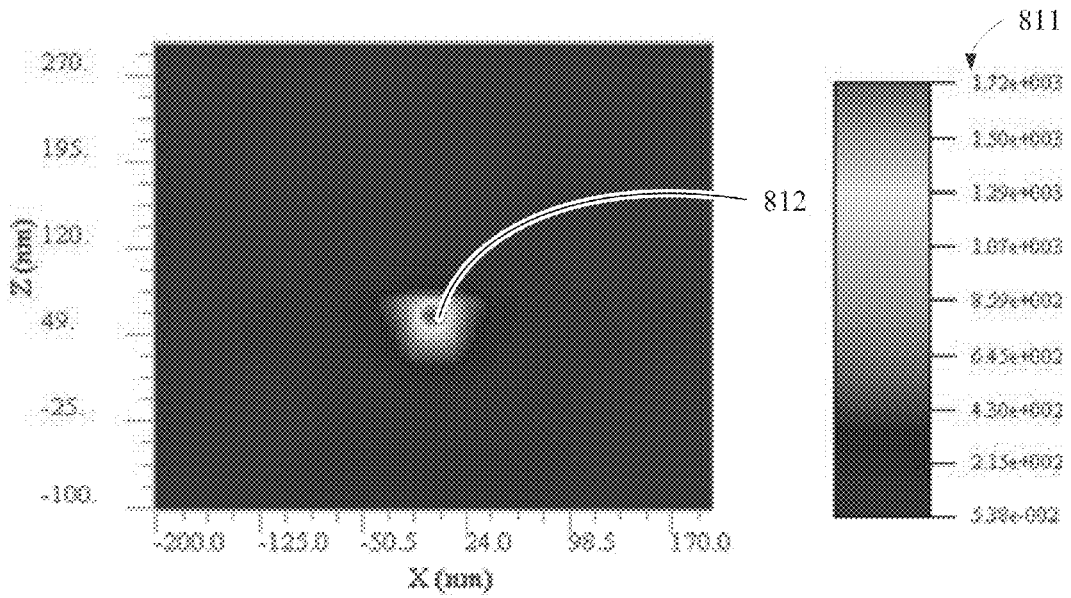
Figure 8B:
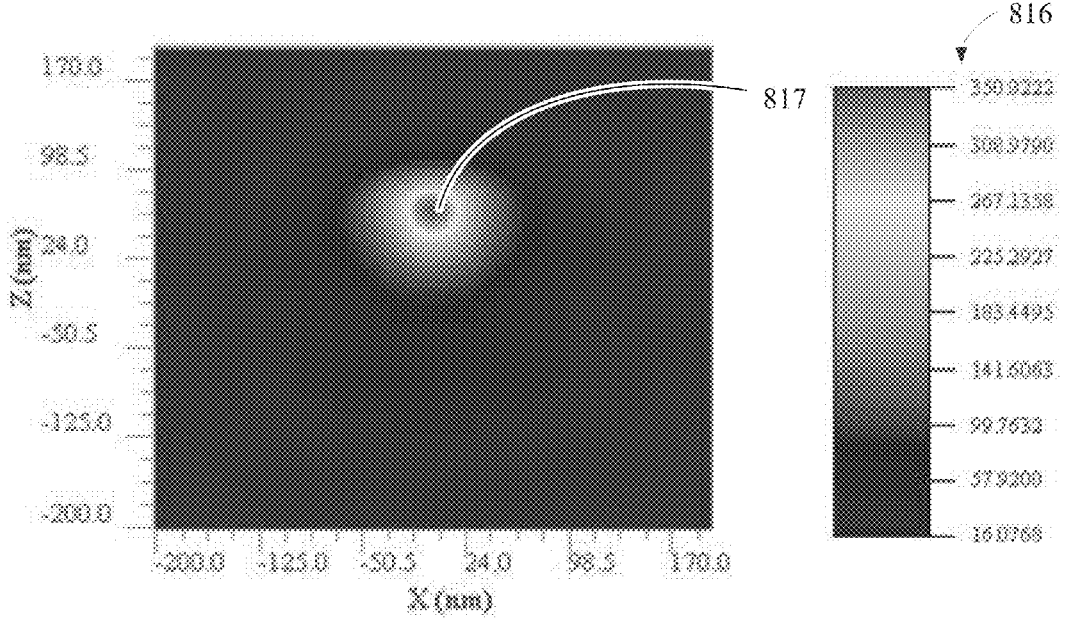
Figure 8C:
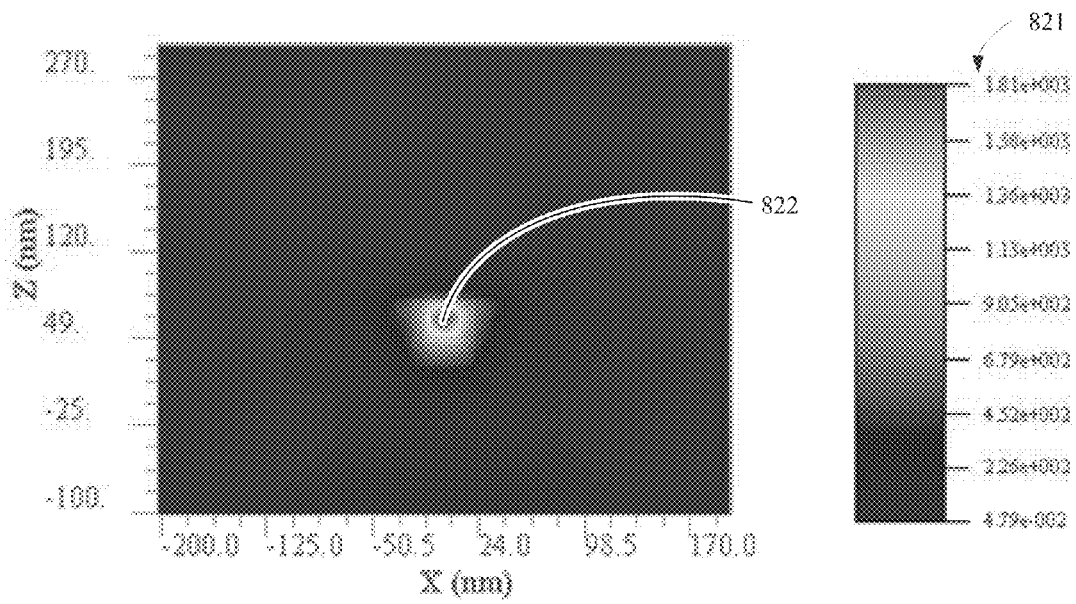
Figure 8D:
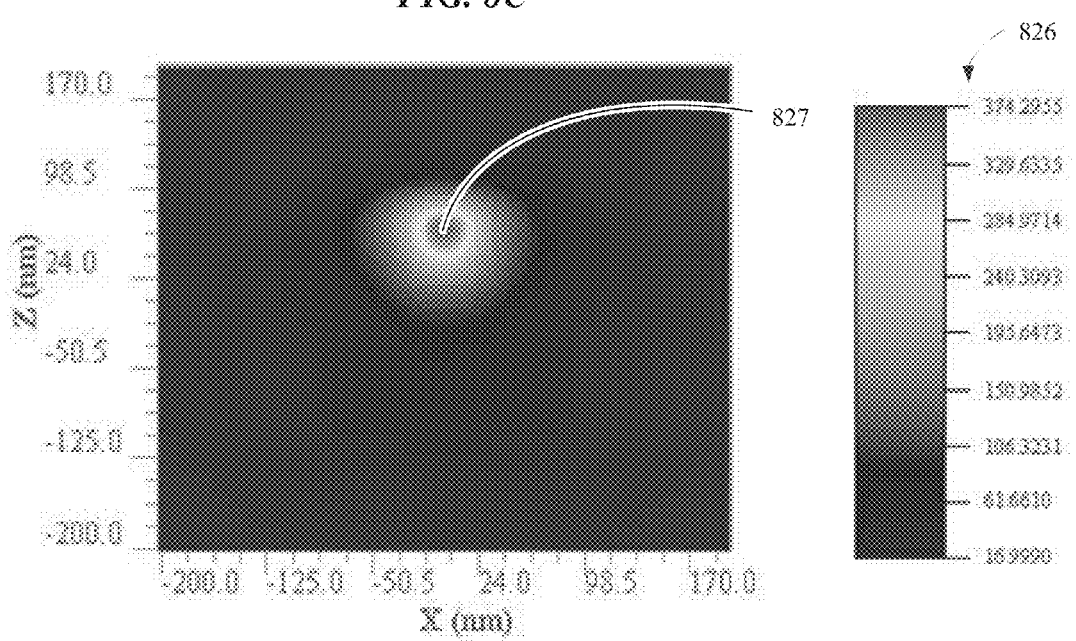
Figure 8E:
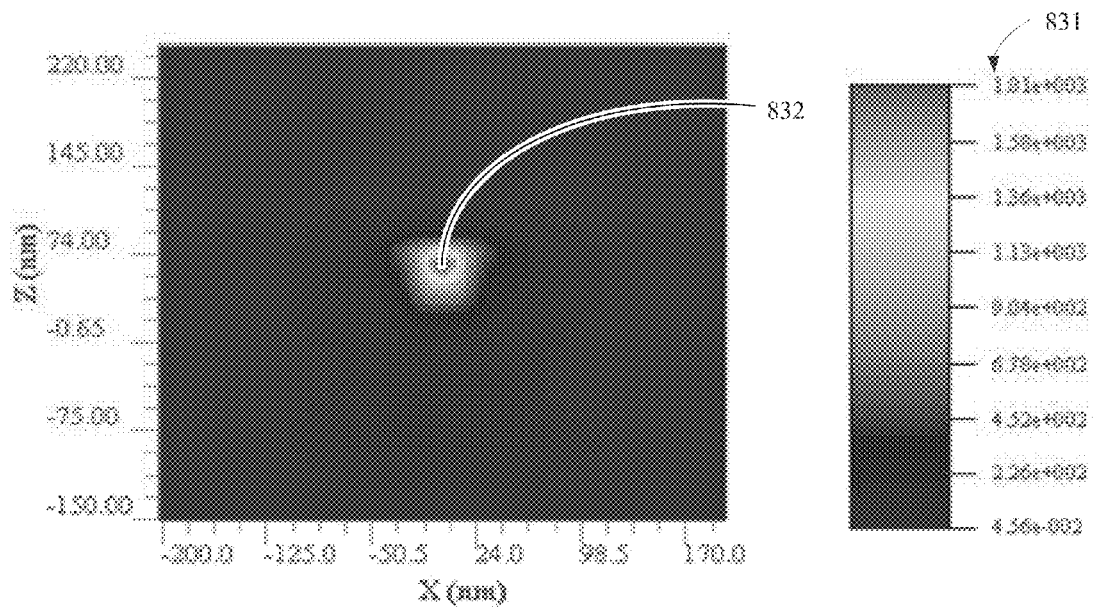
Figure 8F:
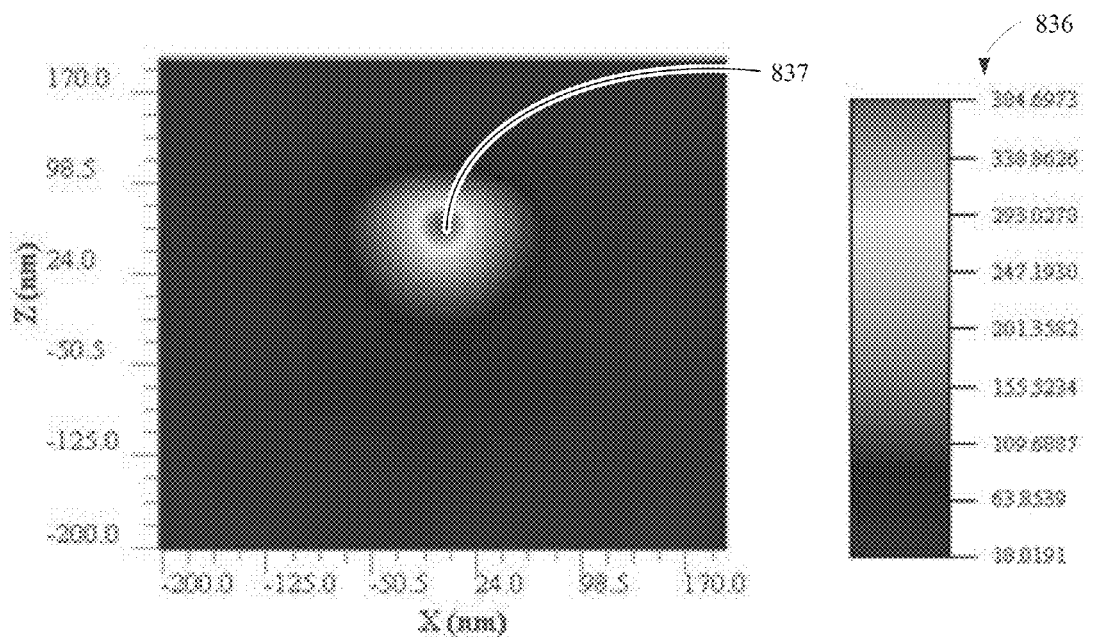

FIGS. 8A, 8C, and 8E and FIGS. 8B, 8D, and 8E show the computed light absorption profiles and thermal spot (in degrees C.), respectively, in recording media with a heat-sink layer comprising W and an additional heat-sink layer comprising Cu. While keeping the total thickness of the two heat-sink layers to be 75 nm, various thicknesses of the W and Cu heat-sink layers have been used. FIGS. 8A and 8B show the light absorption and thermal spot, respectively, of the structure: glass substrate/Cu (60 nm)/W (15 nm)/MgO (10 nm)/FePtCuC. The x and z dimensions of the optical spot (see, FIG. 8A) are (35.2, 38.9) nm with $CE_{50}$=0.0312 and peak magnitude of light absorption of $1.72 \times 10^3$ watts/$(\mu m)^3$ with incident power=1 watt. The full width half maximum intensity (FWHM) of the thermal spot (see, FIG. 8B) is (66.8, 63.8) nm and the peak magnitude of the thermal spot is 350.8 degrees C. FIGS. 8C and 8D show the light absorption and thermal spot, respectively, of the structure: glass substrate/Cu (50 nm)/W (25 nm)/MgO (10 nm)/FePtCuC. The x and z dimensions of the optical spot (see, FIG. 8C) are (34.6, 39.5) nm with $CE_{50}$=0.0327 and peak light absorption of $1.81 \times 10^3$ watts/$(\mu m)^3$ with incident power=1 watt. The FWHM of the thermal spot (see, FIG. 8D) is (66.3, 65.2) nm and the peak magnitude of the thermal spot is 374.3 degrees C. FIGS. 8E and 8F show the light absorption and thermal spot, respectively, of the structure: glass substrate/Cu (35 nm)/W (40 nm)/MgO (10 nm)/FePtCuC. The x and z dimensions of the optical spot (see, FIG. 8E) are (34.6, 39.5) nm with $CE_{50}$=0.0329 and peak magnitude of light absorption of $1.81 \times 10^3$ watts/$(\mu m)^3$ with incident power=1 watt. The FWHM of the thermal spot (see, FIG. 8F) is (68, 66) nm and the peak magnitude of the thermal spot is 384.7 degrees C. Note that the legends 811, 821, 831 at the right in FIGS. 8A, 8C, 8E shows light absorption magnitude in watts/$(\mu m)^3$ with incident power=1 watt. The legends 816, 826, 836 at the right in FIGS. 8B, 8D, 8F shows magnitude of the spot temperature in degrees C.

It will be appreciated from FIGS. 8A-8F that the magnitude of the peak light absorption 812, 822, 832 increases when the thickness of the Cu heat-sink layer decreases and the thickness of the W heat-sink layer increases. Since larger peak absorption 812, 822, 832 indicates a better coupling efficiency, thicker Cu heat-sink layer and thinner W heat-sink layer lead to a better combination in terms of coupling efficiency and optical spot size. The peak temperature of the thermal spot 817, 827, 837, is also shown for various thicknesses of W and Cu heat-sink layers. It can be seen that the peak temperature of the thermal spot 817, 827, 837 (and the FWHM of the thermal spot) increases as the thickness of the Cu heat-sink layer decreases and the thicknesses of the W heat-sink layer increases.

Using the data from FIGS. 8A-8F, FIG. 10 provides graphs of the thermal spot peak magnitude (graph 1001), $CE_{50}$ (graph 1002), and optical absorption peak magnitude (graph 1003), all with respect to thickness of the heat sink layer.

Figure 9A:
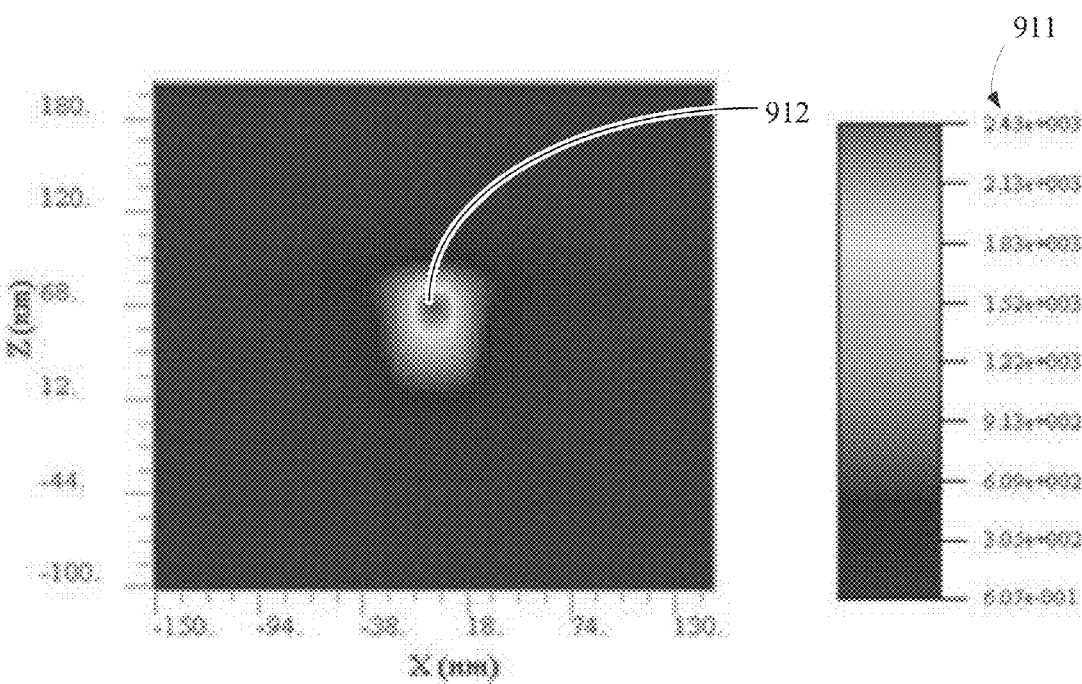
Figure 9B:
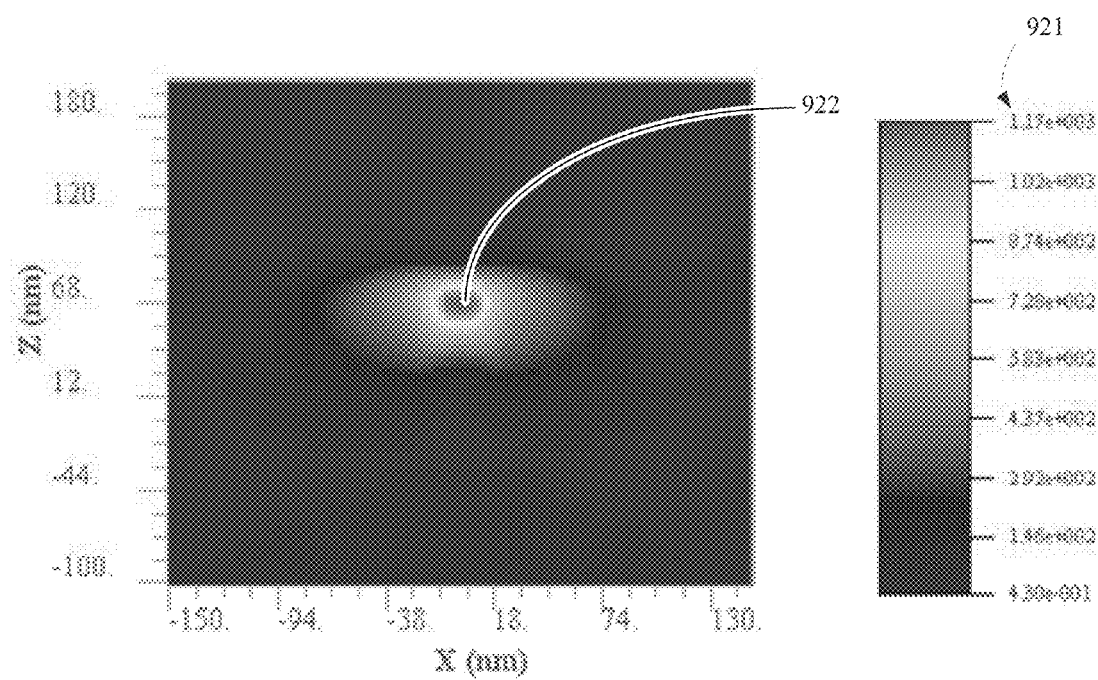
Figure 9C:
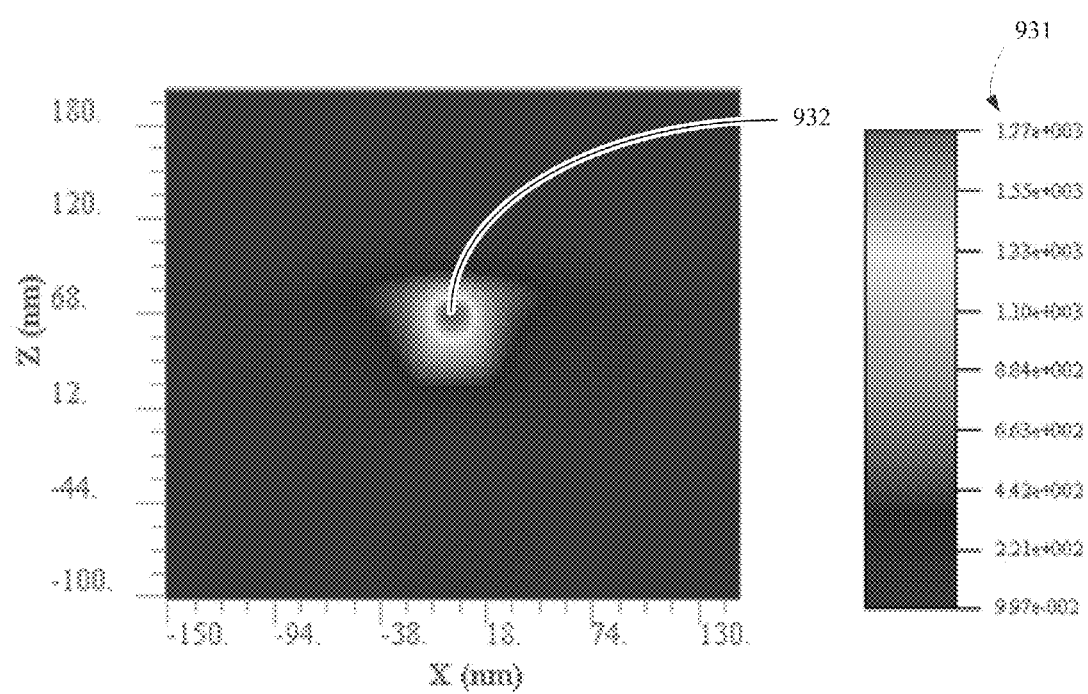
Figure 10:
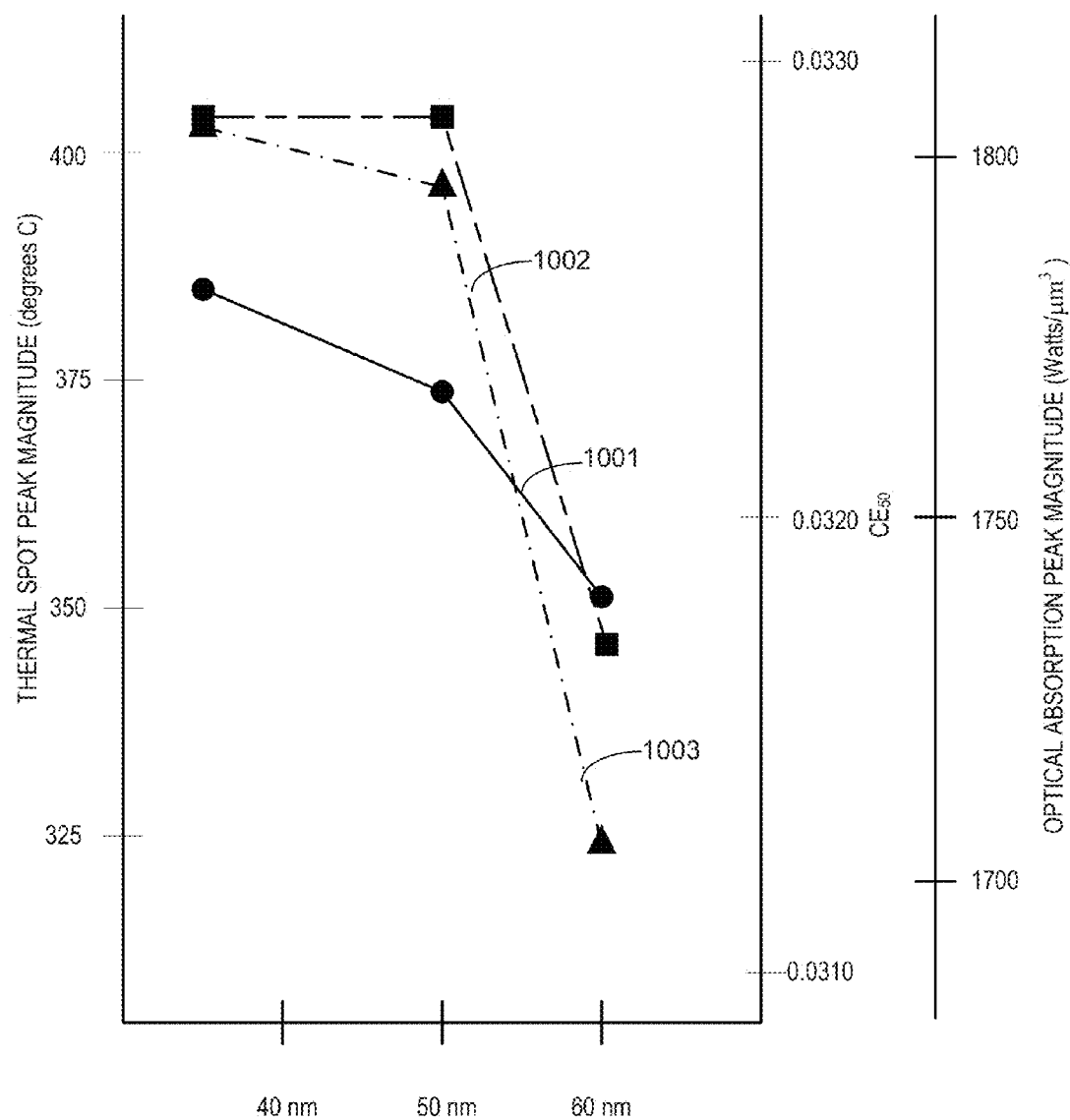
FIG. 10 shows graphs of the thermal spot peak magnitude, $CE_{50}$, and optical spot peak magnitude with respect to thickness of the heat sink layer.

FIGS. 9A-9C show the computed light absorption profiles in a recording media for a gap-plasmon near-field transducer. FIG. 9A shows the light absorption profile for the structure: Si/MgO (20 nm)/Magnetic layer (12.6 nm) with FWHM= (34.3, 47.6) nm; FIG. 9B shows the light absorption profile for the structure: Cu (70 nm)/MgO (10 nm)/Magnetic layer with FWHM=(52.2, 37.8) nm; and FIG. 9C shows the light absorption profile for the structure: Cu (70 nm)/MgO (20 nm)/Magnetic layer with FWHM=(35.8, 42) nm The optical spots 912, 922, 932 in terms of light absorption magnitude (see legends 911, 921, 931) are shown in FIGS. 9A-9C, for heat-sink layers comprising Si (FIG. 9A) and Cu (FIGS. 9B and 9C). Comparing FIG. 9B with FIG. 9C, it is seen that a thicker MgO layer, i.e., the thermal resist layer, enhances the NFT coupling efficiency as indicated by the higher peak light absorption 931 of $1.77 \times 10^3$ watts/$(\mu m)^3$ as compared to the peak light absorption 921 of $1.77 \times 10^3$ watts/$(\mu m)^3$ of the structure of FIG. 9B. The thicker MgO layer also decreases the spot size, as indicated by the smaller optical spot 932 of FIG. 9C as compared to optical spot 932 of FIG. 9B. The decrease in spot size and increase in light absorption occurs due to the thicker MgO layer which spaces the Cu layer farther away from the NFT, thus reducing the image charge effect in the Cu layer. Comparing FIG. 9A with FIG. 9C, it can be seen that replacing Cu with Si in the heat-sink layer enhances coupling efficiency indicated by higher peak absorption magnitude ($2.43 \times 10^3$ watts/$\mu m^3$) of the Si—containing heat sink compared to the peak absorption magnitude ($1.77 \times 10^3$ watts/$\mu m^3$) of the Cu—containing heat sink, 931.

It is to be understood that even though numerous characteristics of various embodiments have been set forth in the foregoing description, together with details of the structure and function of various embodiments, this detailed description is illustrative only, and changes may be made in detail, especially in matters of structure and arrangements of parts illustrated by the various embodiments to the full extent indicated by the broad general meaning of the terms in which the appended claims are expressed.

What is claimed is:

1. A magnetic stack, comprising:
   a substrate;
   a heat sink layer disposed over the substrate;
   a magnetic recording layer disposed over the heat sink layer, wherein the heat sink layer has an electrical resistivity greater than about $5 \times 10^{-8}$ Ωm; and
   a thermal resist layer disposed between the heat sink layer and the magnetic recording layer.

2. The stack of claim 1, wherein the heat sink layer comprises at least one of an electrical insulator, a dielectric, a lossy metal, and a semiconductor.

3. The stack of claim 1, wherein the heat sink layer comprises diamond like carbon.

4. The stack of claim 1, wherein the heat sink layer comprises at least one of Si, BeO, SiC, and AlN.

5. The stack of claim 1, wherein the heat sink layer comprises at least one of W, Mo, Ru, and Cr.

6. The stack of claim 1, wherein the heat sink layer comprises Si and the substrate comprises glass.

7. The stack of claim 1, further comprising an additional heat sink layer having an electrical resistivity less than the heat sink layer, wherein the additional heat sink layer is disposed between the substrate and the heat sink layer.

8. The stack of claim 7, wherein the additional heat sink layer comprises at least one of Cu, and Al.

9. The stack of claim 7, wherein the additional heat sink layer has a thickness of up to about 200 nm and the heat sink layer has a thickness of about 10 nm to about 200 nm.

10. The stack of claim 1, wherein the heat sink layer has a thermal conductivity greater than about 1 W/mK.

11. The stack of claim 1, wherein the magnetic recording layer includes crystalline grains of magnetic material segregated by a non-magnetic material, the crystalline grains having an average volume less than about 12 nm×12 nm in-plane footprint.

12. A magnetic stack, comprising:
a substrate;
a heat sink layer disposed over the substrate;
a magnetic recording layer disposed over the heat sink layer, wherein the heat sink layer is configured to function as a heat sink and a soft under layer; and
a thermal resist layer disposed between the heat sink layer and the magnetic recording layer.

13. The stack of claim 12, wherein the heat sink layer has a coercivity less than about 100 Oe, a relative permeability greater than about 10, a thickness of up to about 50 nm, a thermal conductivity greater than about 1 W/mK and an electrical resistivity greater than about $5 \times 10^{-8}$ $\Omega$m.

14. The stack of claim 12, wherein the heat sink layer comprises at least one of Co, CoFe, NiFe, CoNiFe, and CoFeB.

15. The stack of claim 12, further comprising an additional heat sink layer having an electrical resistivity less than the heat sink layer, wherein the additional heat sink layer is disposed between the substrate and the heat sink layer.

16. The stack of claim 12, further comprising one or more additional heat sink layers having an electrical resistivity greater than about $1 \times 10^{-8}$ $\Omega$m.

17. The stack of claim 16, wherein the one or more additional heat sink layers are disposed between at least one of
the heat sink layer and the thermal resist layer; and
the substrate and the heat sink layer.

18. The stack of claim 16, wherein the additional heat sink layer comprises at least one of an electrical insulator, a dielectric, a lossy metal, and a semiconductor.

19. A magnetic stack comprising:
a layer, the layer having an electrical resistivity greater than about $5 \times 10^{-8}$ $\Omega$m and a thermal conductivity greater than about 1 W/mK; and
a magnetic recording layer disposed over the layer.

20. A system, comprising:
a magnetic write pole;
a near field transducer (NFT) positioned proximate the write pole and comprising an energy radiating end that radiates energy;
a magnetic stack located a head-media separation (HMS) distance from the near field transducer, the magnetic stack comprising:
a substrate;
a magnetic recording layer; and
means for coupling the energy radiated by the near field transducer and the magnetic stack with a efficiency of about 1% to about 10% and conducting heat away from the magnetic recording layer.

21. The system of claim 20, wherein the means for coupling has an electrical resistivity greater than about $5 \times 10^{-8}$ $\Omega$m.

22. The system of claim 20, wherein the HMS is about 3 nm to about 15 nm.

* * * * *